United States Patent [19]

Kim

[11] Patent Number: 5,770,908
[45] Date of Patent: Jun. 23, 1998

[54] MOTOR HAVING VARIABLE AIR GAP

[75] Inventor: Sung-min Kim, Suwon, Rep. of Korea

[73] Assignee: Samung Electronics Co., Ltd., Kyungki-Do, Kuwait

[21] Appl. No.: 653,351

[22] Filed: May 24, 1996

[30] Foreign Application Priority Data

May 27, 1995 [KR] Rep. of Korea ................... 1995-13582

[51] Int. Cl.$^6$ ................................................. H02K 21/12
[52] U.S. Cl. ............................ 310/90; 310/156; 310/164; 310/67 R; 310/201; 360/84
[58] Field of Search ............................. 310/90, 261, 268, 310/191, 256, 164, 156, 67 R; 360/84

[56] References Cited

U.S. PATENT DOCUMENTS 3,678,311  7/1972  Mattingly ................................. 310/156
4,117,519  9/1978  Shioyama et al. ......................... 360/84
5,146,126  9/1992  Hutchins ................................. 310/156

FOREIGN PATENT DOCUMENTS

A 50-056968  4/1975  Japan .
A 50-081121  6/1975  Japan .
2059175      4/1981  United Kingdom ............. H02K 2/24

*Primary Examiner*—Steven L. Stephan
*Assistant Examiner*—Timothy A. Williams
*Attorney, Agent, or Firm*—Sughrue, Mion, Zinn, Macpeak & Seas, PLLC

[57] ABSTRACT

An air gap varying motor includes a base, a rotation body, a motor rotor, a motor stator which is fixed in the base, and has an inner surface for contacting and supporting the motor rotor to enable the motor rotor to rotate about a predetermined axis, and which is disposed to have a distance spaced from said motor rotor An engagement and adjustment member connects the rotation body and the motor rotor and to adjust a distance between the motor rotor and the motor stator.

8 Claims, 2 Drawing Sheets

MOTOR HAVING VARIABLE AIR GAP

BACKGROUND OF THE INVENTION

The present invention relates to a drum motor, and more particularly, to an air gap varying motor which can adjust a distance of an air gap between a stator and a rotor of the motor.

A general motor has a stator and a rotor. The rotor is rotated by an electromotive force induced between a coil and a magnet which are selectively installed in the stator and the rotor, respectively. An existing flat-type motor in which a rotor is positioned over a stator will be described below with reference to FIG. 1.

FIG. 1 is a front sectional view of an existing flat-type drum motor. The drum motor of FIG. 1 rotates about an axis 5 indicated by a one-dot-broken-line. A drum stationary portion, or base, 10 has a cylindrical shape having a plate-shaped protrusion 12 protruding toward the axis 5. A drum rotation portion 20 is accommodated in an inner space formed by an inner wall of the drum stationary portion 10 and the protrusion 12. A reference numeral 30 denotes a motor stator, which includes a yoke 31 attached to the upper surface of the protrusion 12 and a coil 32 supported by the yoke 31 and forming an electric field when electrical current is passed therethrough. The motor stator 30 is attached and supported to a printed circuit board (PCB) 33. The PCB 33 transmits an external motor driving current to the coil 32. A reference numeral 40 denotes a motor rotor, which is rotatably installed about the axis 5 at a distance above the PCB 33. The motor rotor 40 includes a magnet 41 opposing the PCB 33 at a distance from the PCB 33, a housing 42 for supporting the magnet 41 and a bushing 43 fixed in the housing 42. Bolts 50 are screw-connected to the bushing 43 and the drum rotation portion 20, in which the bolts 50 are opposed to each other across the axis 5. Thus, the bushing 43 and the drum rotation portion 20 can rotate integrally about the axis 5.

The motor shown in FIG. 1 has a constant air gap G between the PCB 33 to which the motor stator 30 is attached and the magnet of the motor rotor 40. The air gap G determines a torque and the rotational speed of a motor in accordance with a product to which the motor is installed.

However, the motor illustrated in FIG. 1 has a constant air gap G in a direction parallel to the axis 5 of the bushing 43. Thus, to adapt the motor to various products each requiring the motor, a bushing 43 and bolts 50 should be designed to have different sizes. Also, if the specification of the product is changed, it is expensive to fabricate a new motor adapted for the changed specification.

SUMMARY OF THE INVENTION

Therefore, to solve the above problem, it is an object of the present invention to provide a motor having a variable air gap which can easily adjust a torque and the rotational speed of a motor.

To accomplish the above object of the present invention, there is provided an air gap varying motor comprising:
a base:
a rotation body;
a motor rotor;
a motor stator which is fixed in the base, and has an inner surface for contacting and supporting the motor rotor to enable the motor rotor to rotate about a predetermined axis, and which is disposed at a distance from said motor rotor at a portion electromagnetically interacting with the motor rotor; and
an engagement and adjustment member for connecting the rotation body and the motor rotor and adjusting a distance between the motor rotor and the motor stator.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to FIG. 2.

Figure 1:
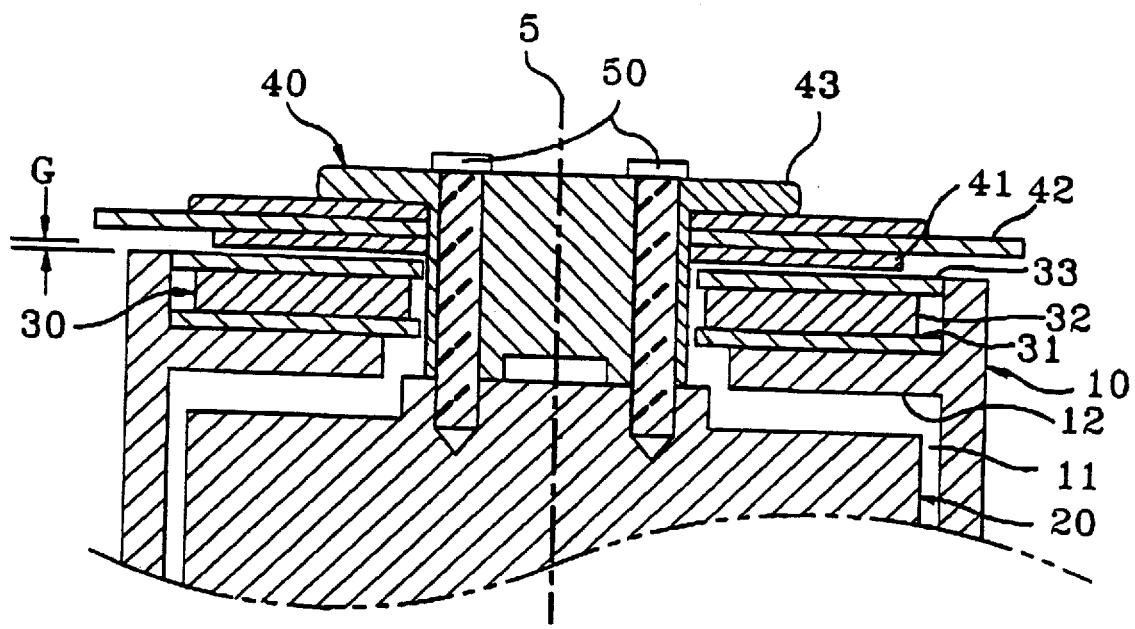
FIG. 1 is a cross-sectional view of an existing drum motor.
Figure 2:
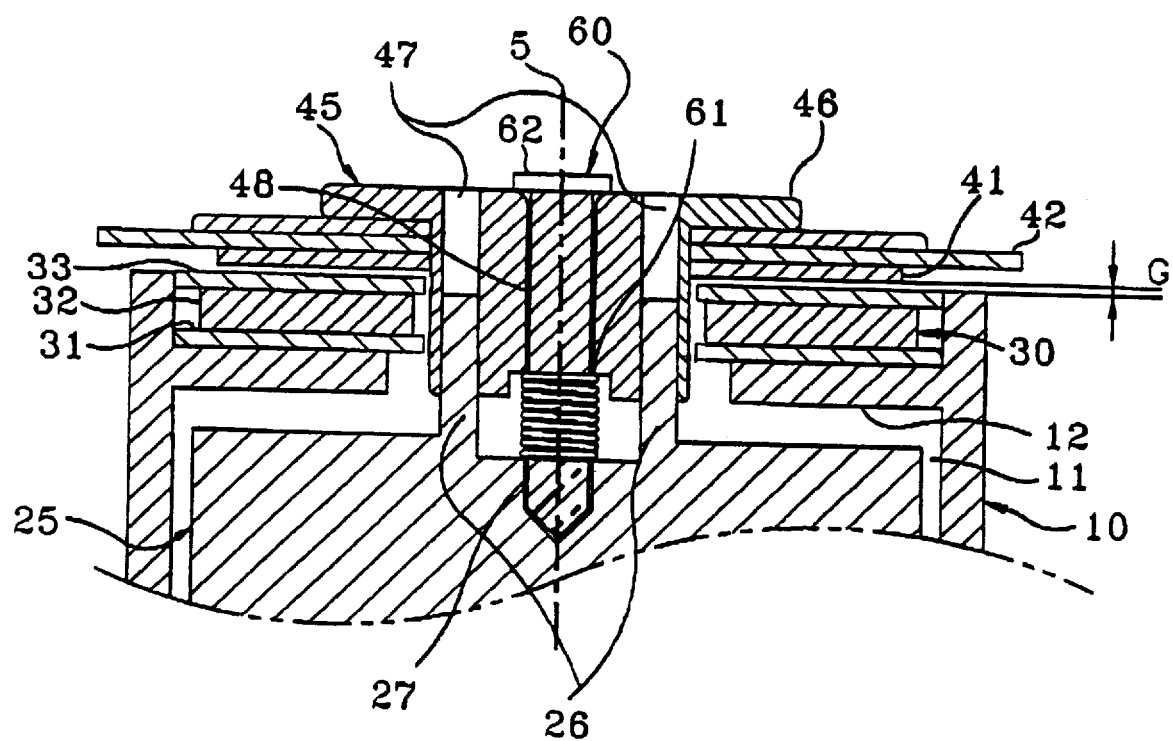
FIG. 2 is a cross-sectional view of an air gap varying motor according to a preferred embodiment of the present invention.

In FIG. 2 showing a cross-sectional view of an air gap varying motor according to a preferred embodiment of the present invention, elements having the same reference numerals as those of FIG. 1 have the same structures and functions as those of FIG. 1. Thus, the apparatus illustrated in FIG. 2 will be described below based on the novel elements of the present invention.

A reference numeral 25 denotes a drum rotation portion, which includes a guide member 26 protruding from the upper surface of the drum rotation portion and a female screw groove 27 which is positioned along the axis 5. A reference numeral 45 denotes a motor rotor which includes a bushing 46, a magnet 41 and a housing 42, which are inserted to an inner side surface parallel to the axis 5 of the motor stator 30. The bushing 46 has a guide groove 47 extending parallel to the axis 5. The guide member 26 of the drum rotation portion 25 is rotatably inserted into the guide groove 47. The guide member 26 and the guide groove 47 insure that the rotational axis of the bushing 46 coincides with the rotational axis of the drum rotation portion 25. When a distance between the bushing 46 and the guide member 26 varies, the guide member 26 moves in the direction parallel to the axis 5 within the guide groove 47. An engagement and adjustment member 60 for engaging the bushing 46 with the drum rotation portion 25 has an end portion which is screw-connected with the female screw groove 27 of the drum rotation portion 25 and a head portion 62 for supporting the bushing 46 and the drum rotation portion 25 to maintain the engagement state therebetween. The engagement and adjustment member 60 is interposed in an elongated hole 48 formed along the center axis of the bushing 46. An elastic member 61 is positioned in an empty space between the upper surface of the drum rotation portion 25 and the lower surface of the bushing 46, and generates a restoring force to cause the bushing 46 and the drum rotation portion 25 to bias away from one another. The elastic member 61 according to the embodiment of the present invention is a cylindrical compression coil spring disposed around the engagement and adjustment member 60 as shown on FIG. 2. However, the present invention is not limited to only the cylindrical compression coil spring, and it is apparent to an ordinary skilled person that a different element maintaining the engagement state of the drum rotation portion 25 and the bushing 46 can be used.

The above-described head portion 62 of the engagement and adjustment member 60 adjusts an air gap G between the upper surface of the PCB 33 to which the motor stator 30 is attached and the magnet 41. The head portion 62 allows the engagement and adjustment member 60 to be rotated through external manipulation, with an appropriate tool or the like, and can be designed to have a shape to enable manual operation or an electrical operation. If the head portion 62 is fabricated into the form of a bolt to enable manual operation, it is possible to manually operate the engagement and adjustment member 60 with a wrench. Also, if gears are formed in the head portion 62 and the gears are threadly engaged with gears of a feeding motor (not shown), the engagement and adjustment member 60 can be controlled electrically through the feeding motor. Since such mechanical designs concerning the head portion 62 would be apparent to an ordinary artisan, further detailed description thereof will be omitted.

If the engagement and adjustment member 60 is loosened by an operation with respect to the head portion 62, a relative distance between the bushing 46 and the drum rotation portion 25 increases due to the restoring force of the elastic member 61. As a result, the air gap G becomes larger. If the engagement and adjustment member 60 is tightened, a relative distance between the bushing 46 and the drum rotation portion 25 decreases and the elastic member 61 is compressed. As a result, the air gap G becomes smaller. As is well known, as the air gap G becomes smaller, a torque becomes larger. As the air gap G becomes larger, the rotational speed becomes larger. Therefore, the torque and the rotational speed of the motor can be controlled by manipulation of the engagement and adjustment member 60, to be adapted for a product requiring the motor.

The above-described engagement and adjustment member 60 can be modified to be screw-connected with the inner surface of the bushing 46. Such a modification can maintain the air gap G in the controlled state without having an elastic member 61 for maintaining the engagement state of the bushing 46 and the drum rotation portion 25.

As described above, the air gap varying motor according to present invention can vary the characteristics of the motor, that is, the number rotational speed and the torque, to thereby a single motor to suit many applications. Thus, the present invention can be widely used for various products requiring different motor features. The present invention can be easily adapted to a change of the specification of the products.

While only preferred embodiments of the invention have been specifically described herein, it will apparent that numerous modifications may be made thereto without departing from the spirit and scope of the invention as defined by the appended claims.

What is claimed is:

1. An air gap varying motor comprising:
    a base:
    a rotation body rotatably supported by and accommodated within said base;
    a motor rotor;
    a motor stator which is fixed to said base, and which supports said motor rotor to enable said motor rotor to rotate about a predetermined axis, said motor stator being disposed apart from said motor rotor over a predetermined distance to electromagnetically interact with said motor rotor; and
    engagement and adjustment means for connecting said rotation body and said motor rotor and adjusting said distance between said motor rotor and said motor stator;
    wherein said motor rotor has a guide hole formed therein parallel to the predetermined axis and said rotation body has a protrusion supported by and received in said guide hole.

2. The air gap varying motor according to claim 1, wherein said engagement and adjustment means comprises one end which is threadably connected with said rotation body and another end coupled to said rotor to adjust said spaced distance between said motor rotor and said motor stator.

3. The air gap varying motor according to claim 2, further comprising an elastic member positioned between said motor rotor and said rotation body, for maintaining the predetermined distance between said motor stator and said motor rotor which has been adjusted by said engagement and adjustment means.

4. The air gap varying motor according to claim 3, wherein said elastic member is a cylindrical compression coil spring.

5. The air gap varying motor according to claim 3, wherein said elastic member is supported said engagement and adjustment means.

6. An air gap varying motor comprising:
    a base;
    a rotation body rotatably supported by and accommodated within said base;
    a motor rotor;
    a motor stator which is fixed to said base, and which supports said motor rotor to enable said motor rotor to rotate about a predetermined axis, said motor stator being disposed apart from said motor rotor over a predetermined distance to electromagnetically interact with said motor rotor; and
    engagement and adjustment means for connecting said rotation body and said motor rotor and adjusting said distance between said motor rotor and said motor stator;
    wherein said engagement and adjustment means is threadably connected to said drum rotation portion.

7. The air gap varying motor according to claim 6, wherein said rotation body has a a female thread formed therein in a cavity that extends parallel to said predetermined axis.

8. The air gap varying motor according to claim 6, wherein said motor is a flat-type drum motor.

* * * * *